(12) United States Patent
Amthor

(10) Patent No.: US 11,287,802 B2
(45) Date of Patent: Mar. 29, 2022

(54) SIMULATION METHOD FOR SIMULATING A REAL CONTROL FOR AN INDUSTRIAL PROCESS, A SYSTEM, OR A MACHINE, AND SIMULATION SYSTEM FOR CARRYING OUT SUCH A SIMULATION METHOD

(71) Applicant: Siemens Aktiengesellschaft, Munich (DE)

(72) Inventor: Karl-Josef Amthor, Seefeld (DE)

(73) Assignee: Siemens Aktiengesellschaft, Munich (DE)

( * ) Notice: Subject to any disclaimer, the term of this patent is extended or adjusted under 35 U.S.C. 154(b) by 451 days.

(21) Appl. No.: 15/760,942

(22) PCT Filed: Aug. 16, 2016

(86) PCT No.: PCT/EP2016/069375
§ 371 (c)(1),
(2) Date: Mar. 16, 2018

(87) PCT Pub. No.: WO2017/045850
PCT Pub. Date: Mar. 23, 2017

(65) Prior Publication Data
US 2018/0284721 A1    Oct. 4, 2018

(30) Foreign Application Priority Data
Sep. 18, 2015    (EP) .................................... 15185931

(51) Int. Cl.
*G05B 19/4069*    (2006.01)
(52) U.S. Cl.
CPC ............... *G05B 19/4069* (2013.01); *G05B 2219/32017* (2013.01); *G05B 2219/50104* (2013.01); *G05B 2219/50106* (2013.01)

(58) Field of Classification Search
CPC ...... G05B 19/4069; G05B 2219/32017; G05B 2219/50104; G05B 2219/50106
See application file for complete search history.

(56) References Cited

U.S. PATENT DOCUMENTS

| 6,076,026 A | 6/2000 | Jambhekar et al. |
| 7,174,225 B2 | 2/2007 | Dolansky |
(Continued)

FOREIGN PATENT DOCUMENTS

| CN | 101187815 A | 5/2008 |
| CN | 101715577 A | 5/2010 |
(Continued)

OTHER PUBLICATIONS

PCT International Search Report and Written Opinion of International Searching Authority dated Dec. 15, 2016 corresponding to PCT International Application No. PCT/EP2016/069375 filed Aug. 16, 2016.
(Continued)

*Primary Examiner* — Bijan Mapar
(74) *Attorney, Agent, or Firm* — Henry M. Feiereisen LLC

(57) ABSTRACT

Simulation methods for simulating a real control (2) for an industrial process, a plant or a machine shall be able to determine errors occurring in the course of simulation more easily. For this purpose the invention proposes that the simulation system (7) stores intermediate states during the simulation and time-stamps them, wherein a stored intermediate state can be reloaded into the simulation system (7) at a later time and a simulation carried out on the basis thereof. As a result, simulations do not always need to start with the beginning of the control program to be simulated.

9 Claims, 2 Drawing Sheets

(56) References Cited

U.S. PATENT DOCUMENTS

| | | |
|---|---|---|
| 9,122,271 B2 | 9/2015 | Zwanziger |
| 2006/0200259 A1 | 9/2006 | Hoffberg et al. |
| 2010/0198576 A1 | 8/2010 | Dessertenne |
| 2013/0253694 A1* | 9/2013 | Chung ............... G05B 19/4069 700/186 |
| 2014/0324211 A1* | 10/2014 | Sullivan ............. G05B 19/4097 700/182 |

FOREIGN PATENT DOCUMENTS

| | | |
|---|---|---|
| CN | 103048952 A | 4/2013 |
| CN | 104460522 A | 3/2015 |
| DE | 19843780 A1 | 4/1999 |
| DE | 10352815 A1 | 6/2005 |
| EP | 0167245 A1 | 1/1986 |
| EP | 2479630 A1 | 7/2012 |
| WO | WO 2012028161 A1 | 3/2012 |

OTHER PUBLICATIONS

Chinese Search Report issued in corresponding Patent Application 2016800540100 dated Oct. 30, 2019 together with an English translation thereof.

\* cited by examiner

SIMULATION METHOD FOR SIMULATING A REAL CONTROL FOR AN INDUSTRIAL PROCESS, A SYSTEM, OR A MACHINE, AND SIMULATION SYSTEM FOR CARRYING OUT SUCH A SIMULATION METHOD

CROSS-REFERENCES TO RELATED APPLICATIONS

This application is the U.S. National Stage of International Application No. PCT/EP2016/069375, filed Aug. 16, 2016, which designated the United States and has been published as International Publication No. WO 2017/045850 and which claims the priority of European Patent Application, Serial No. 15185931.1, filed Sep. 18, 2015, pursuant to 35 U.S.C. 119(a)-(d).

BACKGROUND OF THE INVENTION

The present invention relates to a simulation method for simulating a real control for an industrial process, plant or machine, wherein a control program for controlling the industrial process, plant or machine is specified for a simulation system, wherein the simulation system determines control commands for the process, plant or machine while the control program is being executed by means of a simulation program and wherein the simulation system determines expected actual values of the process, plant or machine on the basis of a model of the process, plant or machine and takes them into account for the simulation. It also relates to a simulation system for carrying out such a simulation method.

Machine tools are widely known. They are controlled by numerical controls. The numerical controls execute user programs (control programs) which consist of instruction steps, e.g. part programs as defined in DIN 66025 or DIN 66025+. A user program specifies e.g. which machine sequences, e.g. which traversing movements, are performed by a machine tool.

In addition to numerical controls for machine tools, there are a number of other industrial controls generally for controlling industrial processes, plant or machinery. These include, for example, programmable controllers (SPS or PLC) or controls for production machines, robots, etc.

Industrial controls often have a real-time operating system as their operating system. They also have control software. The control software is designed to convert the instruction steps of the user program (control program or part program) into control commands. The real-time operating system ensures that this conversion takes place in real time.

In order to ascertain which processing operations e.g. a part program for a CNC control actually brings about in the case of particular workpiece, it is obviously possible for a workpiece to be processed on a test basis, the processing to be checked, and the user program then to be corrected if necessary. However, it is immediately quite apparent that this procedure is firstly time-consuming, secondly material-intensive, and thirdly expensive.

For this reason, simulation methods for the processing of a workpiece by a machine tool are known, e.g. from the publication DE10352815A1. Such simulation methods enable the processing of a workpiece by a machine tool to be simulated in a computer-aided manner.

In addition, the recording of data to which a time stamp has been attached is known from the publication DE19843780A1.

DE 103 52 815 A1 discloses a simulation method and a simulation system for simulating a real control for a machine tool. A simulation program is used to execute an application program for a machine tool control step by step and to determine machine-dependent control commands for the machine tool.

EP 2479630 A1 discloses a method for collision-free switching of a plant from an off-mode to an operational mode. Here, plant operating state information of contiguous process sections that is required for collision-free startup of the plant is derived at least partly from simulation data of a real-time simulation tool which simulates plant operation in parallel with actual operation in real time.

For simulation of an industrial control, the control program is executed sequentially from the beginning. If an error occurs in the course of the simulation, the cause of which is already in the past given the time lag, the simulation session must be restarted from the beginning for troubleshooting purposes.

SUMMARY OF THE INVENTION

The object of the present invention is to create a simulation method and a simulation system by means of which the causes of errors occurring in the course of the simulation can be identified more easily.

This object is achieved by a simulation method for simulating a real control for an industrial process, a plant or a machine,
  wherein a control program for controlling the industrial process, plant or machine is specified for a simulation system,
  wherein the simulation system determines control commands for the process, plant or machine while the control program is being executed by means of a simulation program,
  wherein the simulation system determines expected actual values of the process, plant or machine on the basis of a model (M) of the process, plant or machine and takes them into account for the simulation,
  wherein the simulation system stores intermediate states during the simulation and time-stamps them, and wherein a stored intermediate state is reloaded into the simulation system at a later time and a simulation is carried out on the basis thereof.

The object is also achieved by a simulation system for simulating a real control for an industrial process, plant or machine,
  wherein a control program for controlling the industrial process, plant or machine can be specified for a simulation system,
  wherein control commands for the process, plant or machine can be determined by the simulation system while the control program is being executed by means of a simulation program,
  wherein expected actual values of the process, plant or machine can be determined by the simulation system on the basis of a model (M) of the process, plant or machine and taken into account in the simulation,
  wherein intermediate states for the simulation can be stored by the simulation system and time-stamped, and wherein a stored intermediate state can be reloaded into the simulation system at a later time and a simulation carried out on the basis thereof.

The core aspect of the present invention is therefore that the simulation system stores intermediate states in the course of the simulation and time-stamps them, wherein the stored intermediate states are reloaded into the simulation system at a later time and a simulation is carried out on the basis thereof. The system can thus be restarted at any time in the simulated past. The simulation does not therefore always have to be restarted from the beginning. This significantly reduces the time required for troubleshooting.

A simulation system according to the invention comprises simulation hardware, preferably a standard PC running simulation software. The simulation software is preferably specifically developed for the real industrial control to be simulated, or at least adapted thereto. To simulate the behavior of the real industrial control which controls a real industrial process, a real plant or a real machine, a control program to be executed by the industrial control is loaded into the simulation system. The control program is preferably identical to the control program running on the real control and describes the control functions to be performed by the control. The control program is run, i.e. executed, by means of the simulation program. For this purpose the simulation program provides the required input data or more specifically input signals ("actual values") and acquires the output signals produced by the simulated control in the form of control commands for the relevant process, plant or machine. Said actual values can also include process or machine states as well as sensor signals to be expected. The actual values are advantageously determined on the basis of suitable models for the respective process, plant or machine. The models are generally incorporated in the simulation system by means of appropriately parameterized software.

According to the invention, intermediate states are read out and stored for the simulated control. This is to be understood in particular as meaning that memory contents and/or system states are read out and buffered. Advantageously, all the relevant memory contents and/or system states of the simulated control are read out and buffered. Therefore, the input signals (actual values) are also acquired, as these are also stored in memories. Advantageously, the buffered data is time-stamped so that the corresponding memories can be subsequently interrogated to ascertain the memory address under which what content was stored at what point in time. If this recording is carried out for the entire duration of the simulation, every state throughout the simulation can be reconstructed and analyzed. Particularly advantageously, however, a particular intermediate state of a simulation carried out can be reloaded if required and the simulation carried out again on the basis of this state. By means of the time-stamping, the data is recorded with a time reference making it possible to identify the point in time or period of time when the data was valid or was present.

For reading out the memory contents or more specifically systems states and for storing the intermediate states in conjunction with a time stamp, a correspondingly programmed simulation control is advantageously present. This also ensures that a stored intermediate state can be restored again to the simulated control if required.

Readout and recording of the intermediate states can take place at particular times, e.g. at periodic intervals throughout the simulation, or for a particular simulation section. However, readout and recording can also be event-triggered. In other words, recording always takes place when the relevant event occurs. However, recording can also be triggered manually, i.e. mainly as a reaction by a user to a corresponding instruction. Particularly for storing memory contents or more specifically system states over a longer period, it is advantageous if the data in question is not read out and stored at regular times, but only when there is a change in a particular item of data. Combined with the above mentioned time stamps which record the time of the last change to the item of data in question, this also enables a complete image of the memory contents, i.e. system states, for a particular point in time to be obtained and the volume of data generated to be significantly reduced.

In a preferred embodiment of the invention, the simulated (virtual) control comprises a plurality of virtual components which correspond to real components of the real control, wherein intermediate states for the individual virtual components are stored. For example, a numerical control (CNC Computerized Numerical Control) for a machine tool generally comprises an NCK (Numerical Control Kernel) incorporating the real-time system responsible for the relative movement between tool and workpiece during processing of the workplace. In addition, a CNC control also always comprises a PLC (Programmable Logic Control) for a large number of ancillary control functions for a machine tool. For example, the latter monitors safety devices or ensures a tool change if necessary. Also generally present as another basic component of a CNC control is an HMI (Human-Machine Interface) which allows operator access to the control. The method according to the invention may only be used for one of the components. However, it is preferably used for a plurality of, in particular for all the components of the control in question. Comprehensive simulation of the corresponding real control and simplified fault finding inventively relating to the entire control are therefore possible.

Advantageously, the virtual components can store and reload the intermediate states component-internally in each case. In other words, each component stores its intermediate states itself and reloads them accordingly if required. This simplifies handling and ensures a better overview of the recorded data.

In another advantageous embodiment, process, plant or machine parameters are specified for the simulation system and the simulation system therefore matches the model of the process, plant or machine to the real process, the real plant or the real machine. This enables the simulation software to be flexibly organized, yet allows sufficiently accurate models to be produced.

BRIEF DESCRIPTION OF THE DRAWING

Further advantages and details will emerge from the following description of an exemplary embodiment in conjunction with the accompanying drawings in which.

DETAILED DESCRIPTION OF PREFERRED EMBODIMENTS

Figure 1:
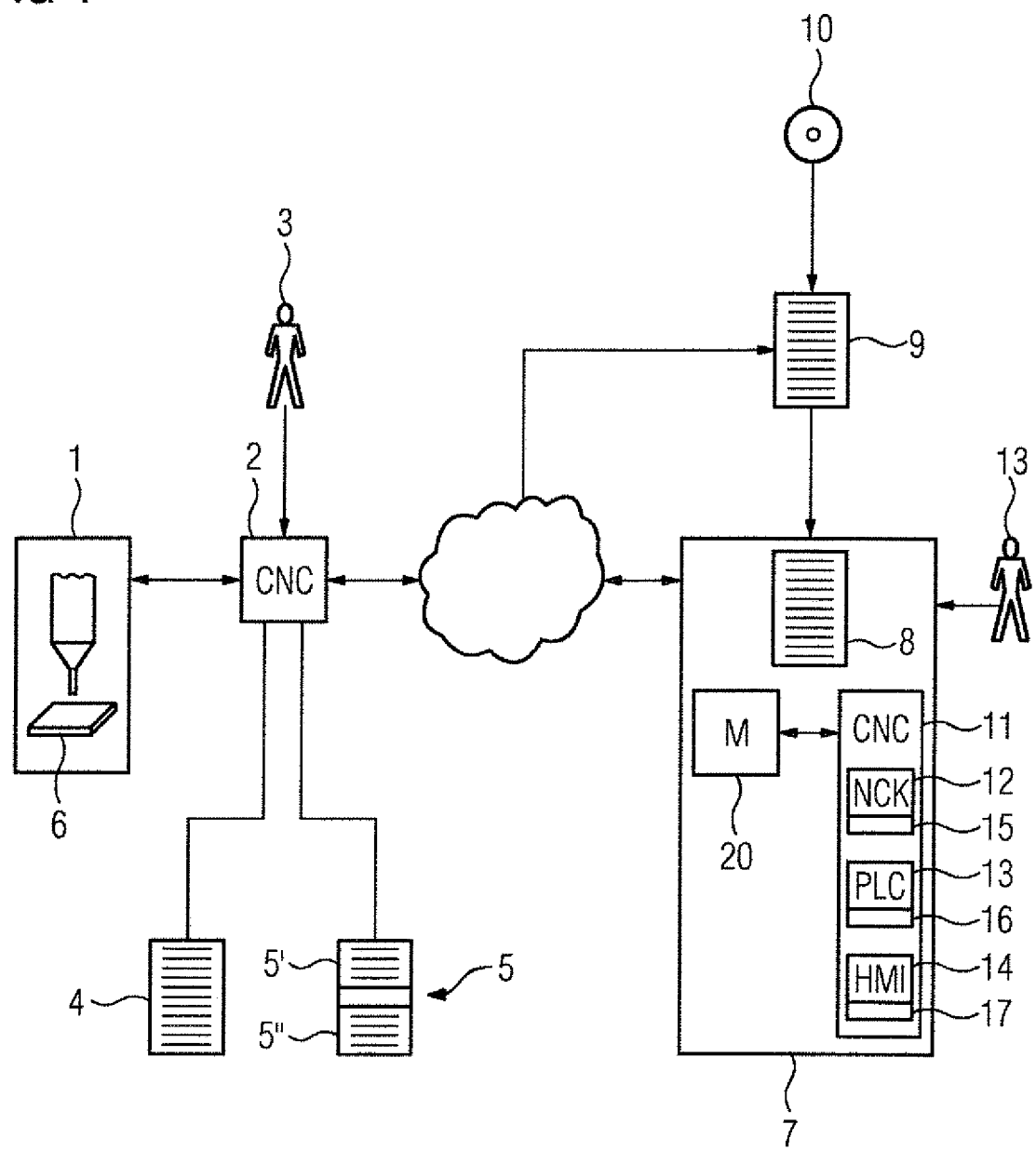
FIG. 1 schematically illustrates a machine tool and a simulation system.

According to FIG. 1, a schematically illustrated machine tool 1 is controlled by a real numerical control 2 (CNC 2). For this purpose the numerical control 2 is supplied with a user program (control program) 4, also termed a part program in a CNC control context, by a user 3 or by a master computer (not shown). Said user program 4 consists of instruction steps which describe the processing to be implemented by the machine tool 1. The instruction steps can alternatively be machine-dependent or machine-independent.

The numerical control 2 executes the user program 4. In the course of executing the user program 4, the numerical control 2 determines, step by step, machine-dependent control commands for the machine tool 1 and controls the machine tool 1 accordingly. This takes place within the framework of a real-time kernel (NCK) 5. The real-time kernel 5 comprises a real-time operating system 5' and control software 5". These are stored in the numerical control 2 by a manufacturer of the numerical control 2. In the course of execution of the user program 4 by the numerical control 2, e.g. a workpiece 6 is processed by the machine tool 1 by means of a tool.

In order to simulate processing of the workpiece 6 by the machine tool 1, a simulation system 7 is provided on which a suitably designed simulation program 8 is run to simulate the control 2. As shown in FIG. 1, the simulation system 7 is an entity different from the numerical control 2. It is therefore not used to control the machine tool 1.

As shown in FIG. 1, the simulation system 7 comprises among other things a mass storage device (not shown), e.g. a hard disk. A control program 9 to be simulated is loaded onto the mass storage device. As indicated in FIG. 1, the control program 9 can be supplied to the simulation system 7 in advance e.g. via a data medium 10 on which the control program 9 is stored in (exclusively) machine-readable form. An example of such a medium 10 is a CD-ROM. However, the control program 9 can also have been supplied to the simulation system 7 in some other way, e.g. via a LAN (LAN=local area network) or the Internet.

The control program 9 is designed for subsequent transfer to the CNC 2 and processing of a workpiece by means of the machine tool 1. However, it must first be tested on the simulation system 7. For this purpose, the simulation system 7 simulates the operation of the real CNC control 2 by means of a virtual CNC control 11. The operation of the machine tool 1 is also encompassed by the simulation system 7 in the form of the virtual machine tool 20. Thus, the simulation system 7 can execute the control program 9 in the same way as it would also run on the real CNC control 2. The model 20 of the real machine tool 1 ensures that the virtual CNC control 7 is provided with the expected actual values (machine states, sensor signals, etc.) of the real machine tool 1 for the respective processing step.

The control program 9 can be called by means of a call instruction which is specified for the simulation system 7. The call instruction can be directly specified for the simulation system 7, e.g. by a user 13. However, it can also be specified via a computer-computer link (not shown), e.g. from the numerical control 2 or from another computer (not shown). Said computer-computer link can basically be of any type. For example, it can be implemented as an Ethernet or Internet connection. Other embodiments are also possible. When the control program 9 is called, the simulation system 7 carries out a simulation method for simulating the CNC control 2 and therefore for simulating the processing of a workpiece 6 by the machine tool 1.

The virtual CNC control 11 is advantageously subdivided in into its essential components, here namely NCK 12, PLC 13 and HMI 14. This subdivision can be implemented, for example, by appropriate subprograms within the simulation program 8. In addition, these components are advantageously assigned their own logical and/or physical memory areas 15 to 17.

According to the invention, intermediate states in the simulation are stored and time-stamped by the simulation system 7 in such a way that a stored intermediate state can be reloaded into the simulation system 7 at a later time and a new simulation carried out on the basis thereof. The data relating to the intermediate states is advantageously stored in the memory areas 15 to 17.

Figure 2:
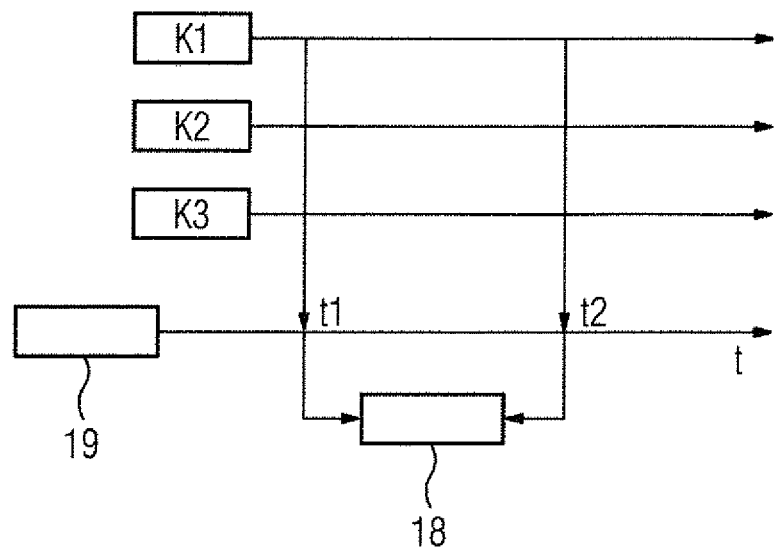
FIG. 2 shows the storing of intermediate states at different times.
Figure 3:
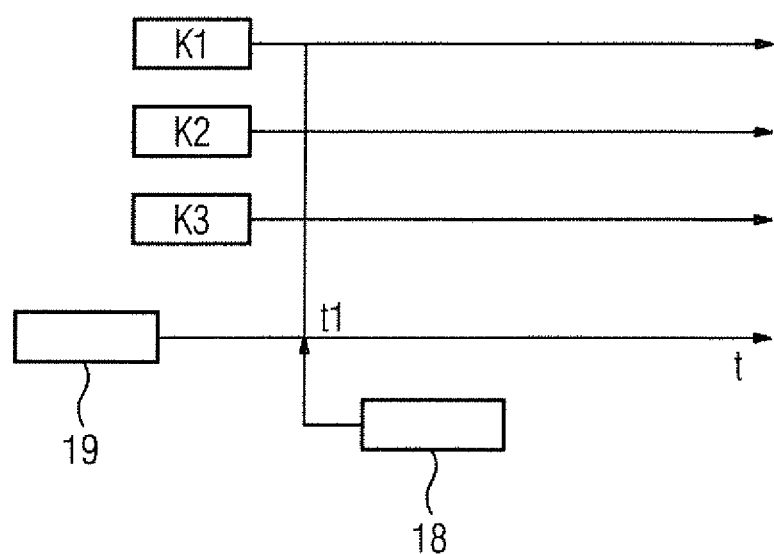
FIG. 3 shows the loading of a stored intermediate state.

FIGS. 2 and 3 illustrate, in a general manner and independently of the specific example as shown in FIG. 1, the buffering and reloading of particular intermediate states. However, persons skilled in the art will readily understand how the explanations apply to the specific example illustrated in FIG. 1.

According to FIG. 2, the respective intermediate states of the components K1, K2 and K3 are temporarily stored in a memory 18 at particular times t1 and t2. Said FIG. 2 illustrates primarily the time sequence. In particular, the memory 18 can also comprise a plurality of logical and/or physical memories which are permanently assigned to the respective components K1 to K3. The readout and storage of the intermediate states is controlled in particular by a simulation control 19. This ensures that the buffered values are each assigned the relevant time stamp so that a respective system state (intermediate state) is assigned a unique time specification for that state.

FIG. 3 now illustrates the resetting of the simulation system to a buffered system state. For this purpose, the time, for which the system is to be reset, i.e. the relevant intermediate state is to be restored, is specified by the user. In the example, this is the time t1. Therefore, the memory contents provided with the time stamp t1 are read out from the memory 18 and transferred back into the original memory cells. The simulation can thus be performed again from t1.

Obviously the control program can be modified before the simulation is restarted from the time t1. As a result, different program variations can be run through again beginning from the time t1. It is also possible for memory contents and/or system states to be modified manually before the simulation is launched. This also enables different initial situations to be tested without having to re-run the control program from the beginning. This increases flexibility and saves time.

The invention claimed is:

1. A simulation method for simulating a real control for an industrial process, a plant or a machine, said simulation method comprising:

specifying a control program for a real control that controls the industrial process, plant or machine, said real control having real components NCK (numerical control kernel), PLC (programmable logic control), and HMI (human-machine interface), executing control commands for the industrial process, plant or machine on a simulation system, while the control program for the real control is being executed, with the simulation system being different from the real control and not controlling the industrial process, plant or machine, determining expected actual values of the industrial process, plant or machine on the basis of a model of the industrial process, plant or machine and taking the actual values into account in a simulation on the simulation system, simulating a simulated control which and execute the simulated control on the simulation system in an identical fashion as the control program on the real control, and storing intermediate states for the individual virtual components during the simulation and time-stamping the intermediate states; and reloading a stored intermediate state into the simulation system at a later time and carrying out a simulation on the basis thereof, wherein the control program is modified and/or wherein memory contents and/or system states are changed manually before the simulation is restarted.

2. The simulation method of claim 1, wherein the virtual components store the intermediate states component-internally.

3. The simulation method of claim 1, further comprising specifying for the simulation system industrial process, plant or machine parameters for matching the model of the industrial process, plant or machine to the real industrial process, real plant or real machine.

4. The simulation method of claim 1 for simulating a numerical control for processing a workpiece by a machine tool.

5. A simulation system for simulating a real control for an industrial process, a plant or a machine, said real control having real components NCK (numerical control kernel), PLC (programmable logic control), and HMI (human-machine interface), and comprising a control program configured to control the industrial process, plant or machine, the simulation system being different from the real control and not controlling the industrial process, plant or machine and comprising a simulated control comprising a plurality of virtual components selected from a simulated numerical control kernel (NCK), a simulated programmable logic control (PLC) and a simulated human-machine interface (HMI) which correspond to the real components NCK, PLC and HMI of the real control, said simulation system being configured to:

execute control commands for the industrial process, plant or machine on the simulation system while the control program for the real control is being executed, determine expected actual values of the industrial process, plant or machine on the basis of a model of the industrial process, plant or machine and taking the actual values into account in a simulation on the simulation system;

simulate the simulated control and execute the simulated control on the simulation system in an identical fashion as the control program on the real control, and store intermediate states for the individual virtual components during the simulation and time-stamp the intermediate states; and reload a stored intermediate state into the simulation system at a later time and carry out a simulation on the basis thereof;

wherein the control program is modifiable and/or wherein memory contents and/or system states are changeable manually prior to a restart of the simulation.

6. The simulation system of claim 5, wherein the intermediate states are stored component-internally by the virtual components.

7. The simulation system of claim 5, configured to receive specified industrial process, plant, or machine parameters for matching the model of the industrial process, plant or machine to the real process, real plant or real machine.

8. The simulation system of claim 5, configured to simulate a numerical control for the processing of a workpiece by a machine tool.

9. A data medium having stored thereon a control program for carrying out a simulation method as claimed in claim 1.

* * * * *